(12) United States Patent
Iwasaki (10) Patent No.: US 8,965,192 B2
(45) Date of Patent: Feb. 24, 2015

(54) AUTOMATIC FOCUSING APPARATUS

(75) Inventor: Naoki Iwasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 13/218,738

(22) Filed: Aug. 26, 2011

(65) Prior Publication Data

US 2012/0063759 A1     Mar. 15, 2012

(30) Foreign Application Priority Data

Sep. 10, 2010  (JP) ................................. 2010-203162

(51) Int. Cl.
*G03B 17/00* (2006.01)
*H04N 5/232* (2006.01)

(52) U.S. Cl.
CPC ....... *H04N 5/23212* (2013.01); *H04N 5/23296* (2013.01)
USPC .......................................................... 396/82

(58) Field of Classification Search
USPC .......................................................... 396/82
See application file for complete search history.

(56) References Cited

U.S. PATENT DOCUMENTS

| 6,522,838 B1 * | 2/2003 | Natsume et al. ................. 396/76 |
| 2004/0037548 A1 * | 2/2004 | Higuma ........................ 396/133 |
| 2009/0273702 A1 * | 11/2009 | Okawara ....................... 348/345 |

FOREIGN PATENT DOCUMENTS

| CN | 1536384 A | 10/2004 |
| CN | 1943226 A | 4/2007 |
| JP | S63-017418 A | 1/1988 |
| JP | H04-139431 A | 5/1992 |
| JP | H04-171431 A | 6/1992 |
| JP | 2001-074999 A | 3/2001 |
| JP | 2003-005018 A | 1/2003 |
| JP | 4106485 B2 | 6/2008 |
| JP | 2009-182547 A | 8/2009 |

* cited by examiner

*Primary Examiner* — Clayton E Laballe
*Assistant Examiner* — Dennis Hancock
(74) *Attorney, Agent, or Firm* — Canon USA Inc. IP Division (57) ABSTRACT

A change to the telephoto side by the zoom control unit makes the stored zoom position as a target, a focus adjustment unit moves a focus lens so as to bring an object into an in-focus state, and the focus adjustment unit, while processing for changing the zoom position is being performed by the zoom control unit, performs a regulating operation of operation for focusing on the object.

11 Claims, 10 Drawing Sheets

AUTOMATIC FOCUSING APPARATUS

BACKGROUND OF THE INVENTION

1. Field of the Invention

The present invention relates to an automatic focusing apparatus, an imaging apparatus, a focusing control method, and a program, and more particularly, to a technology relating to an automatic focusing (AF) which is utilized for electronic still cameras and video cameras.

2. Description of the Related Art

Conventionally, when an automatic focus (sometimes written as AF) is performed in electronic still cameras or video cameras, there has been used a system in which a lens position, at which a high-frequency component of a luminance signal obtained from an image sensor using a charge-coupled device (CCD) or the like becomes maximal, is regarded as an in-focus position. As one of the systems, the following scanning system is known.

More specifically, while driving a lens over the whole range of the focus detection range an evaluation value (sometimes written as a focus evaluation value), which is obtained based on the high-frequency component of the luminance signal obtained from the image sensor, continues to be stored each time, and a lens position corresponding to the maximum value among the stored values is determined as an in-focus position.

Further, there is known a hill-climbing system (sometimes referred to as a continuous AF), in which, when the lens is moved in a direction in which a focus evaluation value increases, a position at which the focus evaluation value becomes maximal is determined as an in-focus position.

Furthermore, there is a method for limiting a focus detection range of an AF by a scanning system to be performed after the imaging preparation instruction is issued by performing the continuous AF before the imaging preparation instruction to maintain an in-focus state, and thereby shortening a time taken for an AF operation.

However, in the conventional camera, there is a problem that, when a zoom position is at a telephoto side, a field of view will be displaced significantly by slightly moving the camera. For this reason, it is difficult and takes a time to bring again the object, which has once gone out of the field of view, into the field of view, at the time of telephoto imaging of the camera having a high-magnification zoom lens, and in some cases, a distance of the object has changed greatly, and the object has gone out of focus, when the field of view adjustment is achieved.

SUMMARY OF THE INVENTION

The present invention is directed to an automatic focusing apparatus, and an imaging apparatus capable of, even when an object has gone out of a field of view at the time of telephoto imaging, catching the object by a simple operation again, furthermore, achieving the field of view adjustment without the object being out of focus even when the object has moved in a distance direction during the field of view adjustment.

According to an aspect of the present invention, an automatic focusing apparatus of an imaging apparatus provided with an operation unit that detects a change instruction of a zoom position by an operator includes a zoom control unit configured to change a zoom position to a wide-angle side when a first operation by an operator is detected by the operation unit, and configure to change a zoom position to a telephoto side when a second operation by the operator is detected by the operation unit, a storage processing unit configured, when a zoom position is changed to the wide-angle side by the zoom control unit, to store the zoom position, wherein a change to the telephoto side by the zoom control unit makes the stored zoom position as a target, and a focus adjustment unit configured to move a focus lens so as to bring an object into an in-focus state, wherein the focus adjustment unit, while processing for changing the zoom position is being performed by the zoom control unit, performs a regulating operation of operation for focusing the object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Hereinbelow, descriptions will be given by using an electronic camera (hereinafter, referred to as a camera) as an example of an imaging apparatus to which an automatic focusing apparatus is applied according to an exemplary embodiment of the present invention.

Figure 1:
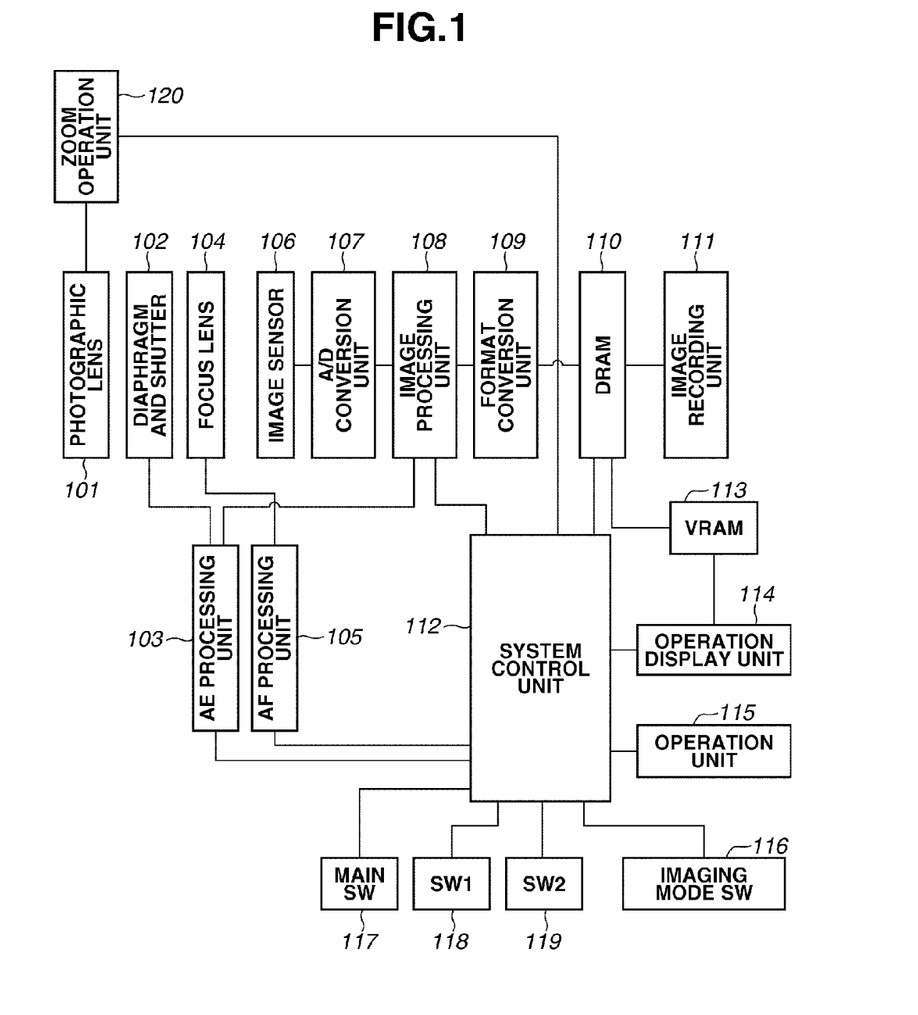
FIG. 1 is a block diagram illustrating a configuration of an imaging apparatus to which an automatic focusing apparatus is applied according to an exemplary embodiment.

FIG. 1 is a block diagram illustrating a configuration of a camera. The camera includes a photographic lens 101 including a zoom mechanism, a diaphragm and shutter 102, which controls light quantity, an automatic exposure (AE) processing unit 103, a focus lens 104 for focusing an image of an object on an image sensor, and an AF processing unit 105 as an example of a focus adjustment unit.

The camera includes an image sensor 106 serving as an imaging unit, which forms an object image and outputs a video signal, an analog-to-digital (A/D) conversion unit 107 including a correlated double sampling (CDS) circuit, which eliminates an output noise, and a nonlinear amplification circuit operable before A/D conversion, an image processing unit 108, and a format conversion unit 109. More specifically, the image sensor 106 outputs a video signal by converting a reflected light from the object into an electric signal.

Further, the camera includes a high speed built-in memory (e.g., a random access memory, hereinafter referred to as a dynamic random access memory (DRAM)) 110, an image recording unit 111 composed of a recording medium such as a memory card and an interface thereof, and a system control unit 112, which controls a system such as an imaging sequence.

The DRAM 110 is used as a high-speed buffer as a temporary image storage unit, or for a work memory in compression/decompression of an image. Further, the system control unit 112 is a computer, and includes a central processing unit (CPU) and a memory therein. In the camera, a memory, which stores a program to be executed by the system control unit 112, may be included.

Further, the camera includes a memory for image display (hereinafter referred to as a video RAM (VRAM)) 113, an operation display unit 114, which performs an image display, a display for operational support, and a state display of the camera, as well as displays of an image to be captured and a range finding area during image capturing process, and an operation unit 115 for operating the camera from the outside.

The operation unit 115 includes a menu switch operable to perform various types of settings, e.g., settings of imaging functions of the camera and settings during image reproduction, a zoom lever operable to instruct a zoom operation of the photographic lens, an operation mode changeover switch operable to switch the operation mode between an imaging mode and a reproduction mode.

Further, the camera includes an imaging mode switch 116 operable to perform settings such as switching a face detection mode between ON and OFF, and a main switch 117 operable to turn the power of a system on.

Furthermore, the camera includes a switch (hereinafter, referred to as a SW 1) 118 for starting an imaging standby operation such as AF or AE, and an imaging switch (hereinafter, referred to as a SW 2) 119 operable to perform imaging operation after an operation of the SW 1. More specifically, the SW 1 is turned ON by a half press of a shutter button (not illustrated), and the SW 2 is turned ON by a full press of the shutter button.

Further, the camera according to the present exemplary embodiment includes a zoom operation unit 120 for assisting a field of view adjustment. An operator can easily perform the field of view adjustment by operating the zoom operation unit 120. An operation of the camera when the zoom operation unit 120 is operated by a user will be described below.

Figure 2:
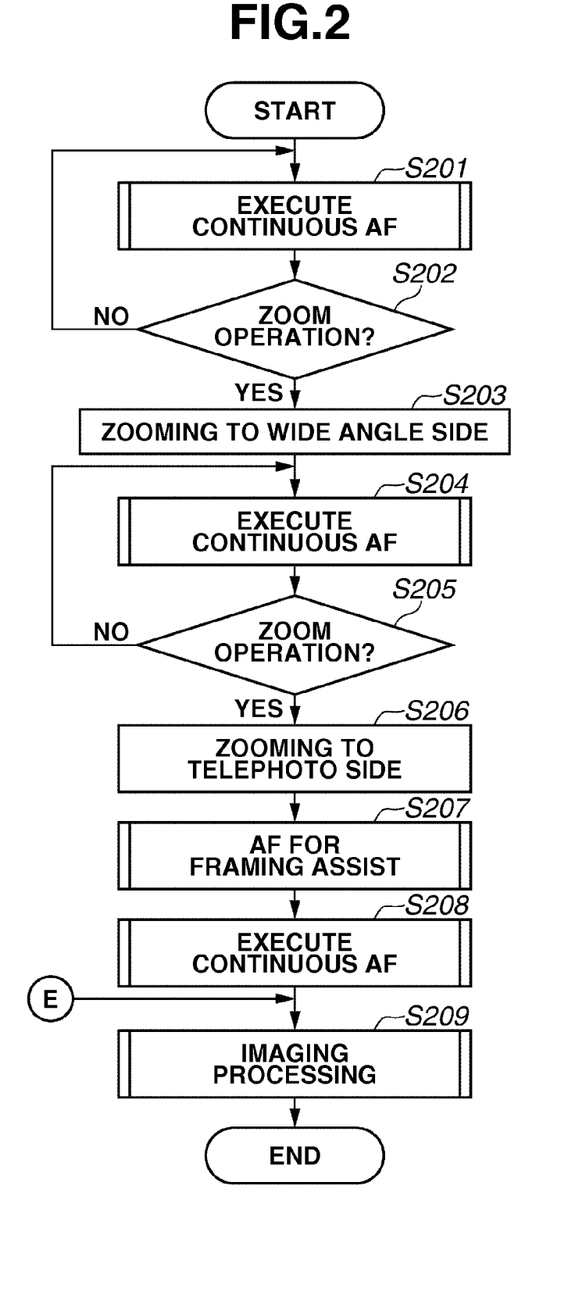
FIG. 2 is a flowchart illustrating an operation of the automatic focusing apparatus.
Figure 9A:
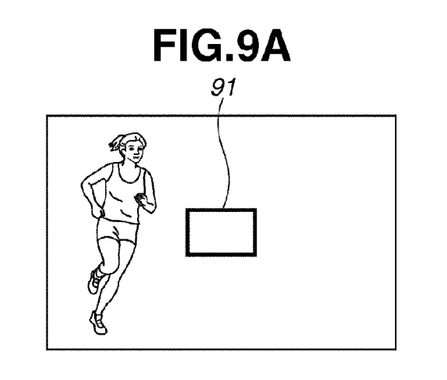
FIGS. 9A to 9F illustrate an example of an object the image of which a camera is capturing.

Next, an operation of a focusing control and image capturing of the camera will be described with reference to the flowchart in FIG. 2 and illustrations in FIGS. 9A to 9F. The flowchart illustrated in FIG. 2 is implemented by the system control unit 112 executing a program stored in the memory. FIGS. 9A to 9F illustrate an example of an object, which is being captured by the camera. In this case, as illustrated in FIG. 9A, the object is enlarged by an operator operating a zoom to a telephoto side by using a zoom lever. A frame in the center illustrated in FIG. 9 indicates an AF frame 91 described below.

First, in step S201, the system control unit 112 performs continuous AF in accordance with the procedure described below. Next, in step S202, the system control unit 112 determines a state of operation of the zoom operation unit 120 by the operator. More specifically, the system control unit 112 determines whether the zoom operation unit 120 has been pressed (a first operation).

Figure 9B:
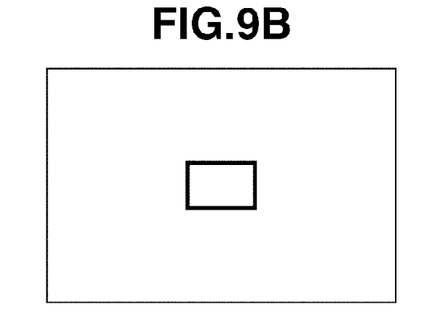

If the zoom operation unit 120 has been operated (YES in step S202), the processing proceeds to step S203. If the zoom operation unit 120 has not been operated (NO in step S202), the processing returns to step S201, and the system control unit 112 continues the continuous AF. In this process, the timing when the operator operates the zoom operation unit 120 is a case where a zoom position is at the telephoto side, and the object goes significantly out of the field of view, as illustrated in FIG. 9B, by the operator slightly moving the camera.

In step S203, the system control unit 112 moves the zoom position to a wide-angle side in order to easily execute the field of view adjustment. This processing corresponds to an example of the processing by a first zoom control unit.

In the conventional technology, the system control unit 112 implements the AF operation in case the object moves in a distance direction even during a zooming drive. However, in the present exemplary embodiment, since there is a high possibility that the operator cannot capture the image of the object in the field of view during the zooming drive, the system control unit 112 does not execute the AF operation, but stops the AF operation.

Figure 9C:
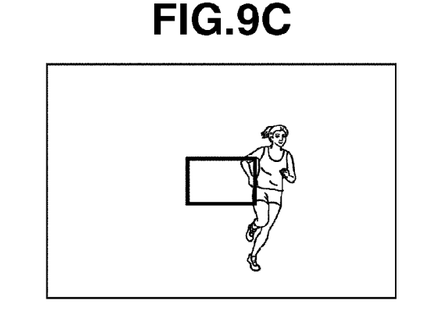

By moving the zoom position to the wide-angle side, the object can be captured again within the field of view, while the object is reduced as illustrated in FIG. 9C. The system control unit 112 stores a zoom position in the DRAM 110 before moving to the wide-angle side. This processing corresponds to an example of the processing performed by the storage processing unit.

Then, in step S204, the system control unit 112 resumes the continuous AF.

Next, in step S205, the system control unit 112 determines a state of an operation of the zoom operation unit 120 by the operator. More specifically, the system control unit 112 determines whether the zoom operation unit 120, which continues to be pressed in step S202 and the subsequent steps, has been released (a second operation), that is, the operator has released the zoom operation unit 120.

Figure 9D:
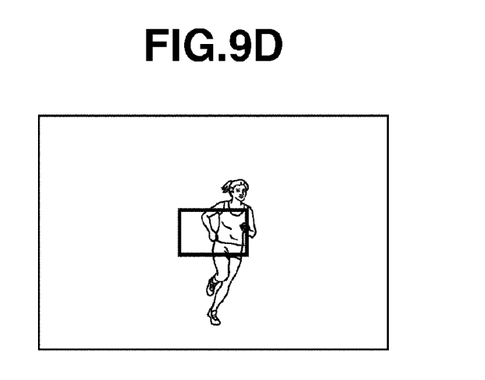

If the zoom operation unit 120 has been operated (released) (YES in step S205), the processing proceeds to step S206. If the zoom operation unit 120 has not been operated (not released), the processing returns to step S204, and the system control unit 112 continues the continuous AF. In this process, the timing when the operator releases the pressing of the zoom operation unit 120 is a case where the object is captured in the substantially middle of the field of view, as illustrated in FIG. 9D.

In step S206, the system control unit 112 moves the zoom position to a position at the telephoto side which has been set before step S202. The processing corresponds to an example of the processing by a second zoom control unit.

Figure 9E:
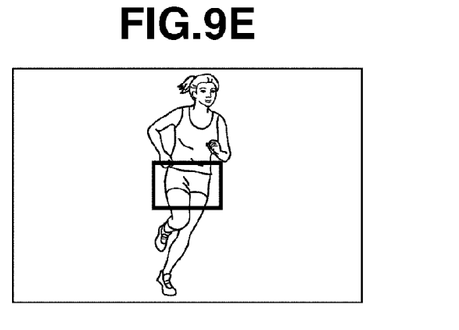

More specifically, the system control unit 112 moves the zoom position to the zoom position stored in the DRAM 110. Therefore, the zoom operation unit 120 can be returned to the zoom position before being operated, in a state where the object is again captured within the field of view, as illustrated in FIG. 9E.

Although it is supposed that the object has been detected during the zooming drive, there is a possibility of unintentionally moving the object from the center of the field of view, depending on zoom magnification, or movement of the object. Since the AF operation when zooming is in progress causes an image around the field of view to be changed significantly, the AF operation is often executed near the center of the field of view. Hence, the AF operation is not executed also during zooming at the telephoto side, and, in step S207, focusing of the object is performed.

In step S207, the system control unit 112 executes AF for field of view adjustment in accordance with the procedure described below. Then, in step S 208, the system control unit 112 resumes the continuous AF.

In the continuous AF performed in step S201, step S204, and step S208, the operator can turn ON or OFF the settings arbitrarily by using the operation unit 115.

In step S209, the system control unit 112 determines a state (ON/OFF) of the SW 1 for instructing the imaging preparation in the continuous AF mode. If the state is ON, after performing the imaging standby operation, the system control unit 112 executes the imaging processing described below, and ends the processing.

Figure 3A:
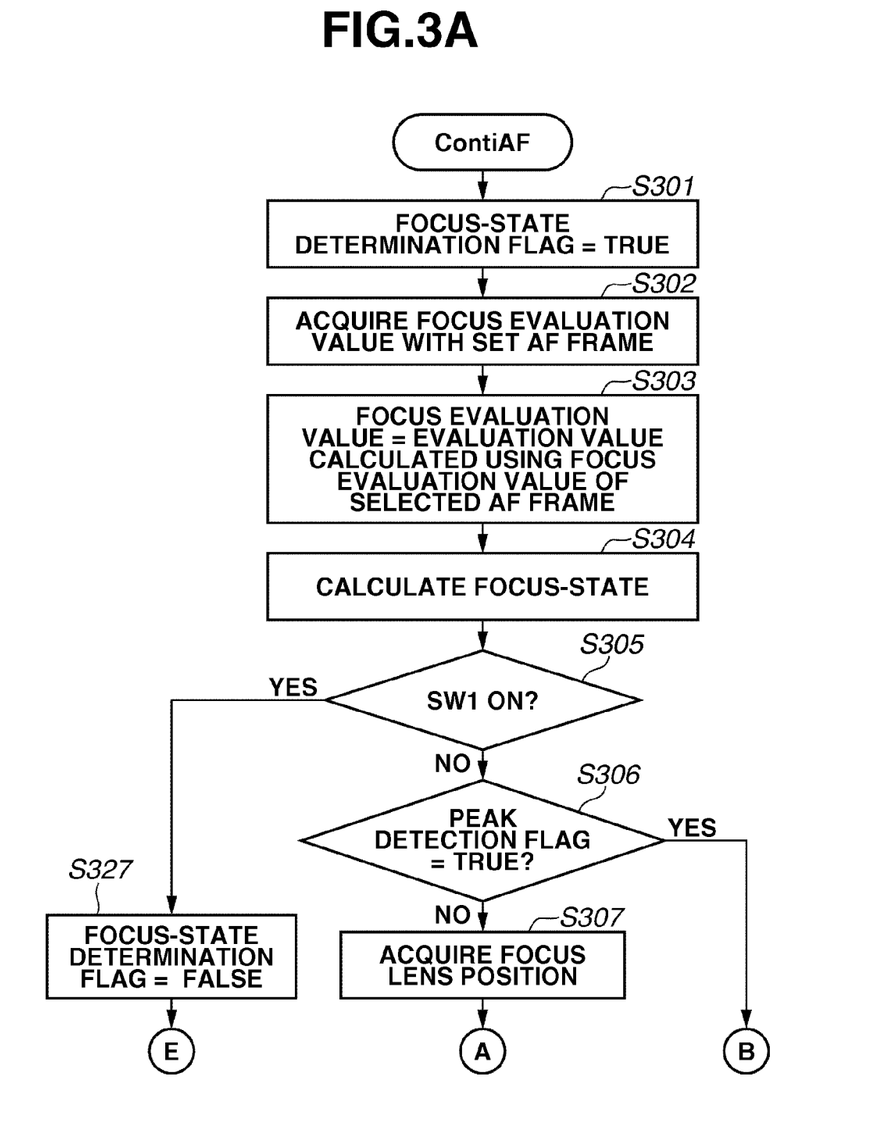
FIG. 3A is a flowchart illustrating an operation of a continuous AF.
Figure 3B:
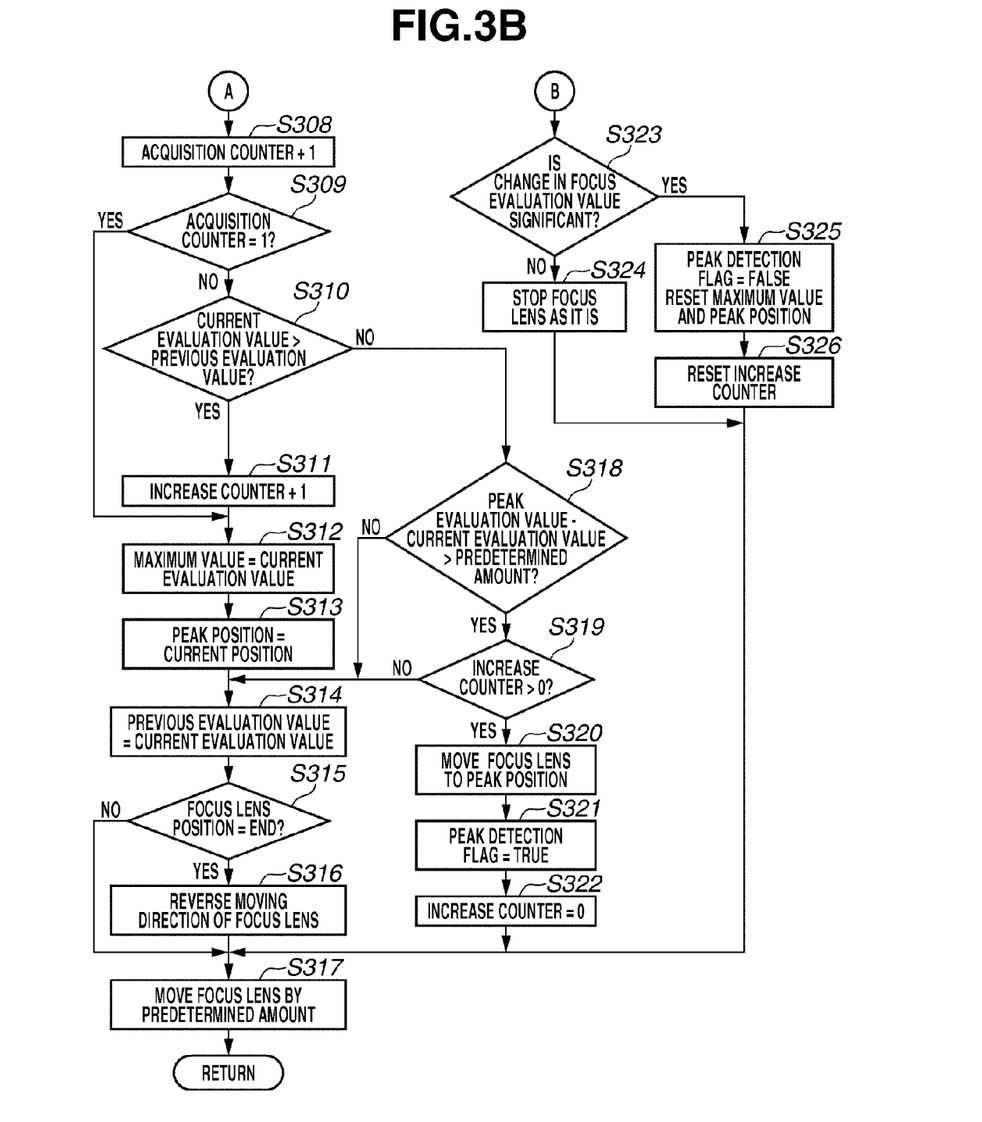
FIG. 3B is a flowchart illustrating an operation of the continuous AF.

Next, the details of the continuous AF in step S201, step S204, and step S208 in the flowchart illustrated in FIG. 2 will be described with reference to the flowcharts in FIG. 3A and FIG. 3B.

First, in step S301, the system control unit 112 turns a focus-state determination flag to TRUE. In step S302, the system control unit 112 acquires a focus evaluation value in each previously set AF frame.

In the present exemplary embodiment, AF frame refers to a target region for acquiring a focus evaluation value within an image plane. Further, focus evaluation value refers to a value obtained by the A/D conversion unit 107 converting an analog video signal read out from the image sensor 106 into a digital signal, and by the image processing unit 108 extracting a high-frequency component of a luminance signal from the output thereof.

The system control unit 112 stores a position of the focus lens 104 and a position of the AF frame associated to each other in the memory within the system control unit 112. Acquiring focus evaluation value refers to reading out focus evaluation value stored in the memory by the AF processing unit 105 for determination for the AF control.

The AF frame can be arbitrarily set to a human face, or near the center of the field of view or the like. In the present exemplary embodiment, the AF frame is set to near the center with a predetermined size.

In step S303, the system control unit 112 sets an evaluation value calculated by using a focus evaluation value of the set AF frame as a focus evaluation value to be used in step S304 and the subsequent steps. In step S304, the system control unit 112 calculates a focus-state based on the focus evaluation value. In the present exemplary embodiment, a focus-state is to be determined in three ranks of high, middle, and low, based on the focus evaluation value.

In step S305, the system control unit 112 determines a state (ON/OFF) of the SW 1 that instructs the imaging preparation. If the state is ON (YES in step S305), the processing proceeds to step S327. In step S327, the system control unit 112 set the focus-state determination flag to FALSE, and ends the present processing. If the state is OFF (NO in step S305), the processing proceeds to step S306.

In step S306, the system control unit 112 determines whether a peak detection flag is TRUE. If the peak detection flag is TRUE (YES in step S306), the processing proceeds to step S323. If the peak detection flag is FALSE (NO in step S306), the processing proceeds to step S307.

In step S307, the system control unit 112 acquires the current position of the focus lens 104. In step S308, the system control unit 112 increments an acquisition counter by 1 for counting acquisitions of focus evaluation values and acquisitions of current positions of the focus lens 104. The acquisition counter is to be set in advance to 0, in an initialization operation (not illustrated).

In step S309, the system control unit 112 determines whether the value of the acquisition counter is 1. If the value of the acquisition counter is 1 (YES in step S309), the processing proceeds to step S312. If the value of the acquisition counter is not 1 (NO in step S309), the processing proceeds to step S310.

In step S310, the system control unit 112 determines whether a "current focus evaluation value" is greater than a "previous focus evaluation value". If the "current focus evaluation value" is greater than the "previous focus evaluation value" (YES in step S310), the processing proceeds to step S311. If the "current focus evaluation value" is not greater than the "previous focus evaluation value" (NO in step S310), the processing proceeds to step S318.

In step S311, the system control unit 112 increments an increase counter by 1. In step S312, the system control unit 112 stores the current focus evaluation value as a maximum value of the focus evaluation values in an arithmetic memory included in the system control unit 112.

In step S313, the system control unit 112 stores a current position of the focus lens 104 as a peak position of the focus evaluation values in the arithmetic memory included in the system control unit 112.

In step S314, the system control unit 112 stores the current focus evaluation value as the previous focus evaluation value in the arithmetic memory included in the system control unit 112.

In step S315, the system control unit 112 determines whether the current position of the focus lens 104 is located at an end of a range finding area. If the current position of the focus lens 104 is located at the end (YES in step S315), the processing proceeds to step S316. If the current position of the focus lens 104 is not located at the end (NO in step S315), the processing proceeds to step S317.

In step S316, the system control unit 112 reverses the moving direction of the focus lens 104. In step S317, the system control unit 112 moves the focus lens 104 by a predetermined amount.

In step S318, the system control unit 112 determines whether "a maximum value of the focus evaluation values–the current focus evaluation value" is greater than a predetermined amount. If "the maximum value of the focus evaluation values–the current focus evaluation value" is greater than the predetermined amount (YES in step S318), the processing proceeds to step S319. If "the maximum value of the focus evaluation values–the current focus evaluation value" is not greater than the predetermined amount (NO in step S318), the processing proceeds to step S314.

In this process, if the "maximum value of focus evaluation values–current focus evaluation value" is greater than the predetermined amount, that is, if current focus evaluation value is decreased by the predetermined amount from the maximum value, the maximum value is determined as a focus evaluation value at a peak position of the focus.

In step S319, the system control unit 112 determines whether the increase counter is greater than 0. If the increase counter is greater than 0 (YES in step S319), the processing proceeds to step S320. If the increase counter is not greater than 0 (NO in step S319), the processing proceeds to step S314.

In step S320, the system control unit 112 moves the focus lens 104 to the peak position at which the focus evaluation value stored in step S313 has become the maximum value. In step S321, the system control unit 112 sets the peak detection flag to TRUE. In step S322, the system control unit 112 sets the acquisition counter to 0.

In step S323, the system control unit 112 determines whether the current focus evaluation value has changed by a predetermined percentage or more relative to the maximum value of the focus evaluation values. If the current focus evaluation value has changed by the predetermined percentage or more (YES in step S323), the processing proceeds to step S325. If the current focus evaluation value has not changed by the predetermined percentage or more (NO in step S323), the processing proceeds to step S324. In step S324, the system control unit 112 holds a position of the focus lens 104 as it is.

In step S325, the system control unit 112, in order to acquire again a focus lens position at which the focus evaluation value becomes maximal, sets the peak detection flag to FALSE, and resets the maximum value and the peak position of the focus evaluation value. In step S326, the system control unit 112 resets an increase counter.

In a manner as described above, in the continuous AF operation, the focus lens 104 is driven so that a main object goes into constantly in-focus state.

Figure 4:
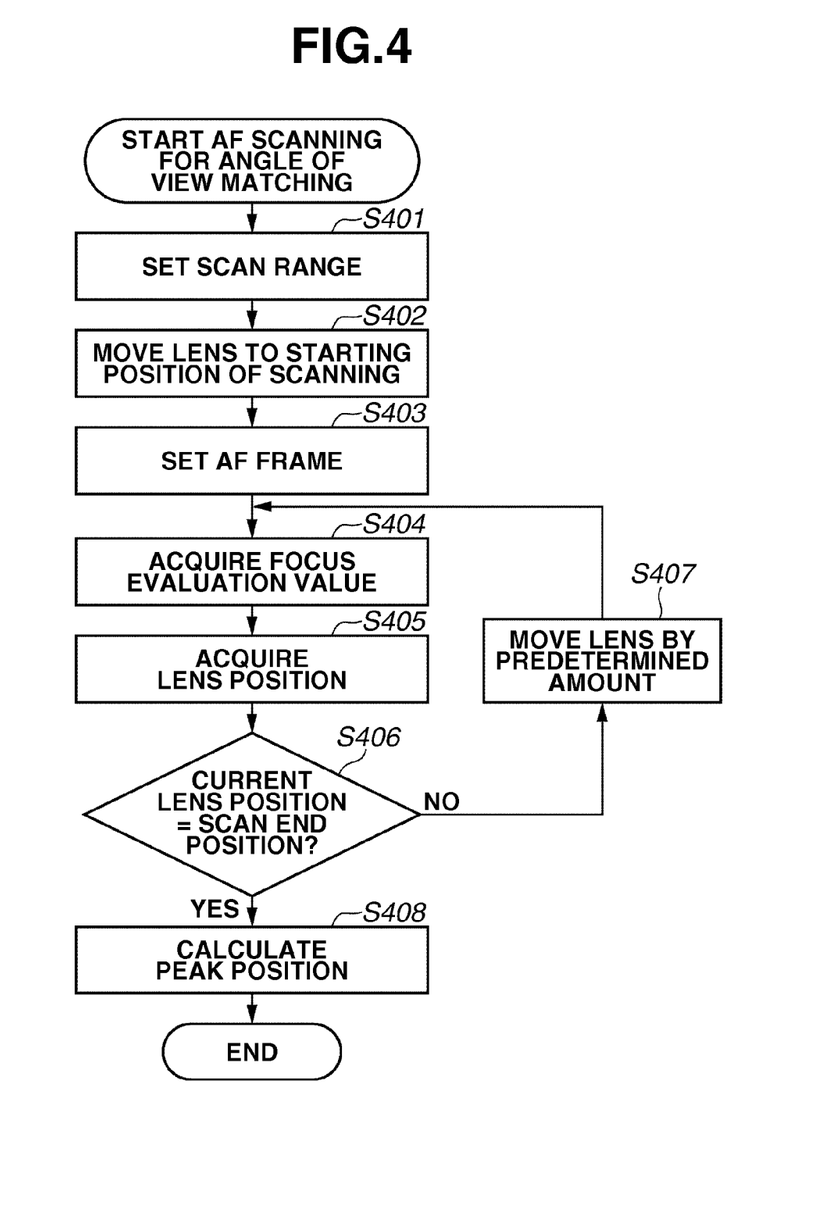
FIG. 4 is a flowchart illustrating an operation of AF for field of view adjustment.

Next, AF scan for field of view adjustment in step S206 in the flowchart illustrated in FIG. 2 will be described with reference to FIG. 4.

First, in step S401, the system control unit 112 sets a scan range. In the present exemplary embodiment, the center of scan is determined based on a focus position of the object determined by the continuous AF, before the zoom operation in step S202.

In other words, in the focus position of the object determined by the continuous AF, a range within which the focus lens 104 is movable is set so that a distance to an object side and a distance to an opposite side to the object becomes equal to each other. In a case where the continuous AF is not executed, a hyperfocal position or the like may be used.

Next, in step S402, the system control unit 112 moves the focus lens 104 to a scan starting position. Here, the scan starting position is an end position of the scan range which is provided assuming a range within which the object moves from the scan center position.

Figure 9F:
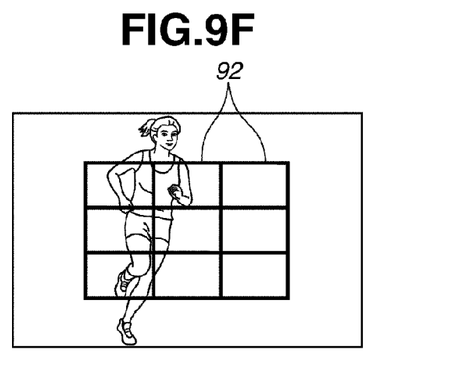

Next, in step S403, the system control unit 112 sets an AF frame. At this timing, the object has been already subjected to the field of view adjustment to the center of the field of view, but the object is likely to separate from near the center, as the zoom position moves to the telephoto side. Hence, assuming such a case, a large AF frame, or a plurality of AF frames 92, as illustrated in FIG. 9F are arranged and set near the center.

The entire region of the large AF frame and the plurality of AF frames are a region greater than the AF frame set by the continuous AF. If the large AF frame is set, a level of the focus evaluation value increases and a signal-to-noise ratio (S/N) becomes strong, and as a result, a focusing capability is enhanced depending on a scene.

On the other hand, if the plurality of AF frames is set, a lot of information of the AF frames can be acquired. As a result, focus information of such as an object and a background can be distinguished from each other, and, for example, the background can be prevented from coming into focus.

In step S404, the A/D conversion unit 107 converts an analog video signal read out from the image sensor 106 into a digital signal, according to an instruction of the system control unit 112, and the image processing unit 108 extracts a high-frequency component of a luminance signal from the output. The system control unit 112 stores the extracted high-frequency component as a focus evaluation value in the memory within the system control unit 112.

In step S405, the system control unit 112 acquires a current position of the focus lens 104, and stores position data in the memory within the system control unit 112.

In step S406, the system control unit 112 determines whether the current position of the focus lens 104 is a scan end position. If the current position of the focus lens 104 is the end position (YES in step S406), the processing proceeds to step S408. If the current position of the focus lens 104 is not the end position (NO in step S406), the processing proceeds to step S407.

In step S407, the system control unit 112 moves the focus lens 104 by a predetermined amount toward the scan end position. After that, the processing returns to step S404. At this time, the system control unit 112 makes a change amount per unit time, when the focus lens 104 is driven, greater than an operation at the time of the continuous AF.

In step S408, the system control unit 112 calculates a peak position of the focus evaluation values from the focus evaluation values and the lens positions stored in step S404 and step S405. In the process, if a plurality of AF frames is set, in calculating the peak position of the focus evaluation value, it may be calculated based on the closest peak position of the frames previously set, or the peak position calculation may be performed in other way of determination.

Figure 5:
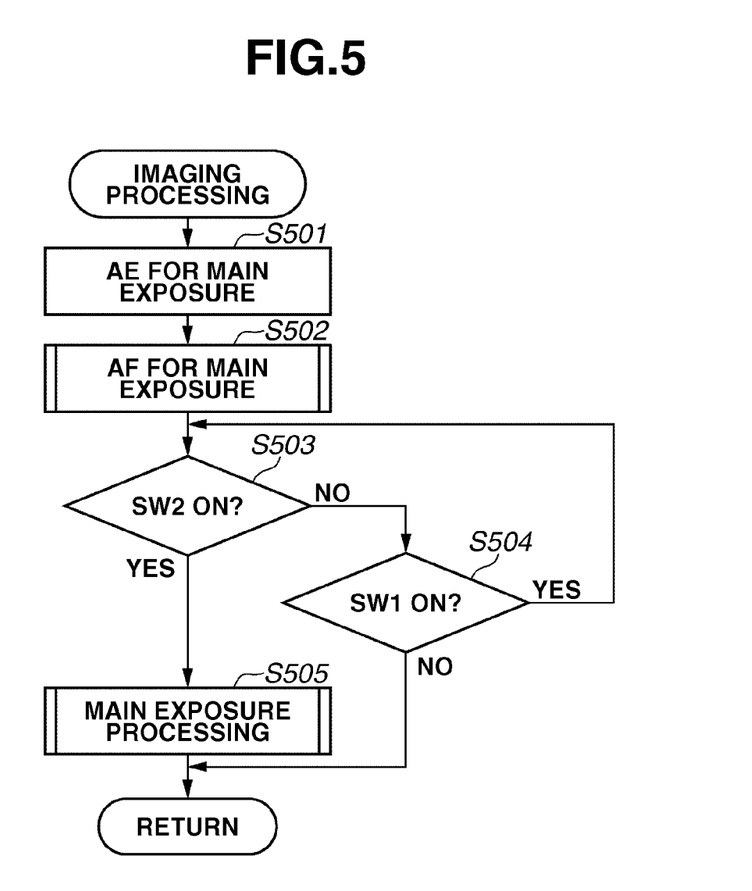
FIG. 5 is a flowchart illustrating an operation of imaging processing.

Next, imaging processing in step S209 in the flowchart illustrated in FIG. 2 will be described with reference to the flowchart in FIG. 5. Here, the state of the SW 1 that instructs the imaging preparation is ON.

First, in step S501, the system control unit 112 performs AE processing for main exposure via the AE processing unit 103. In step S502, the system control unit 112 performs AF for main exposure in accordance with procedure described below via the AF processing unit 105.

In step S503, the system control unit 112 determines a state (ON/OFF) of the SW 2 which instructs imaging operation. If the state is ON (YES in step S503), the processing proceeds to step S505. If the state is OFF (NO in step S503), the processing proceeds to step S504.

In step S504, the system control unit 112 determines a state (ON/OFF) of the SW 1 that instructs the imaging preparation. If the state is ON (YES in step S504), the processing proceeds to step S503. If the state is OFF (NO in step S504), the system control unit 112 ends the main imaging processing. In step S505, the system control unit 112 performs main exposure processing in accordance with the procedure described below, and ends the main imaging processing.

Figure 6:
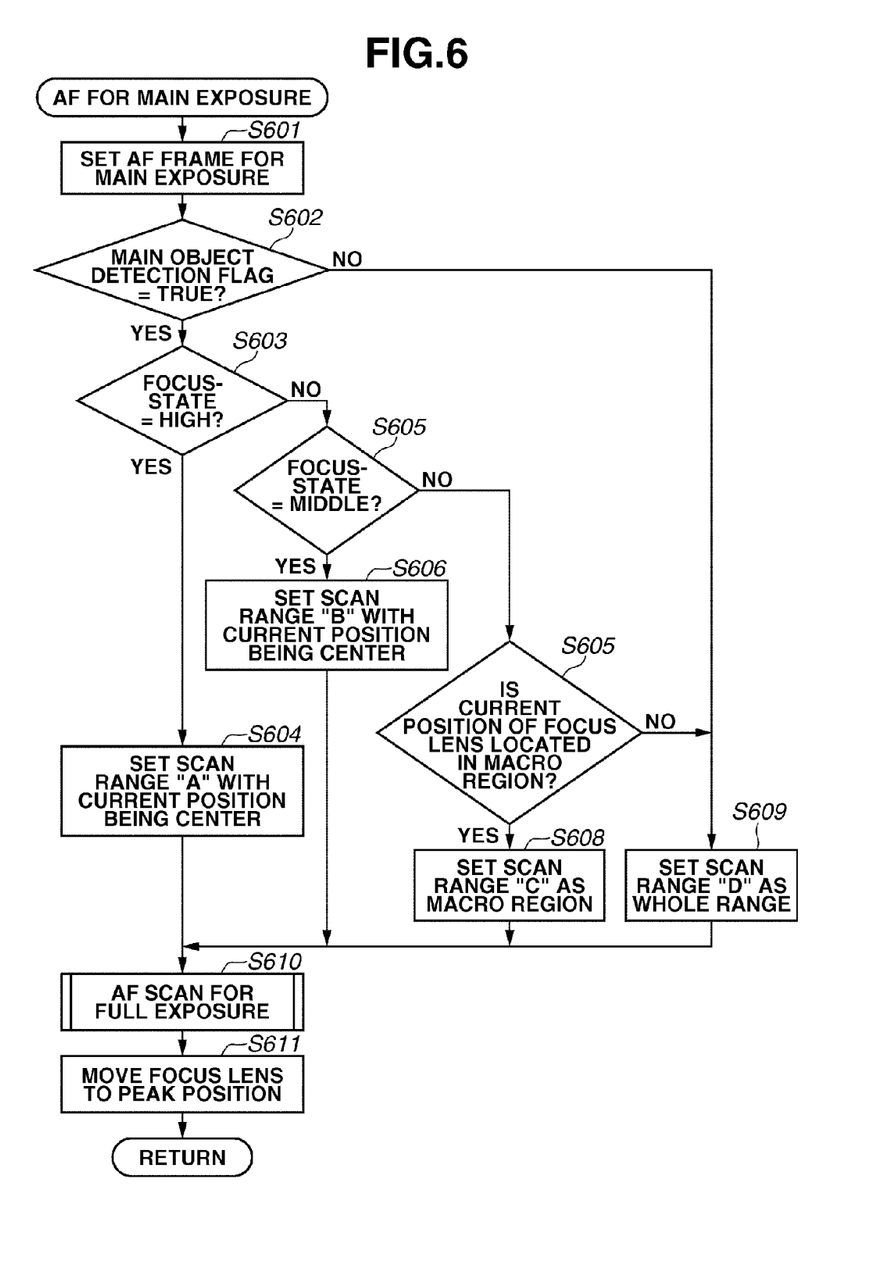
FIG. 6 is a flowchart illustrating an operation of AF for main exposure.

Next, AF for main exposure in step S502 in the flowchart illustrated in FIG. 5 will be described with reference to the flowchart in FIG. 6.

First, in step S601, the system control unit 112 sets the AF frame for main exposure. A setting of the number of frames in this process is performed near the center with a predetermined size. In step S602, the system control unit 112 determines whether a main object detection flag is TRUE. If the main object detection flag is TRUE (YES in step S602), the processing proceeds to step S603. If the main object detection flag is not TRUE (NO in step S602), the processing proceeds to step S609.

In step S603, the system control unit 112 determines whether the focus-state calculated in step S304 is "high". If the focus-state is "high" (YES in step S603), the processing proceeds to step S604. If the focus-state is not "high" (NO in step S603), the processing proceeds to step S605.

In step S604, the system control unit 112 performs setting of a scan range "A" with a current position of the focus lens 104 being the center. In this process, the system control unit 112 determines that a state where the main object is almost in-focus state by the continuous AF operation, in other words, the focus lens 104 is located near an in-focus position at which the focus evaluation value indicates a peak, and sets a narrow scan range.

In step S605, the system control unit 112 determines whether the focus-state calculated in step S304 is "middle". If the focus-state calculated in step S304 is "middle" (YES in step S605), the processing proceeds to step S606. If the focus-state calculated in step S304 is not "middle" (NO in step S605), the processing proceeds to step S607.

In step S606, the system control unit 112 performs setting of a scan range "B" with a current position of the focus lens 104 being a center. In this process, the system control unit 112, although the focus lens 104 is located near the in-focus position by the continuous AF operation, determines that the focus-state is not so much as "high" state, and sets a range wider than the scan range "A".

In step S607, the system control unit 112 determines whether a current position of the focus lens 104 is located in a macro region. If the current position of the focus lens 104 is located in the macro region (YES in step S607), the processing proceeds to step S608. If the current position of the focus lens 104 is not located in the macro region (NO in step S607), the processing proceeds to step S609.

In step S608, the system control unit 112 sets a scan range "C" as a macro region stored in advance. In step S609, the system control unit 112 sets a scan range "D" as the whole range of range finding enabled area stored in advance.

In step S610, the system control unit 112 performs AF scan for main exposure in accordance with the procedure described below. In step S611, the system control unit 112 moves the focus lens 104 to the peak position calculated in step S706 in the flowchart illustrated in FIG. 7 described below.

Figure 7:
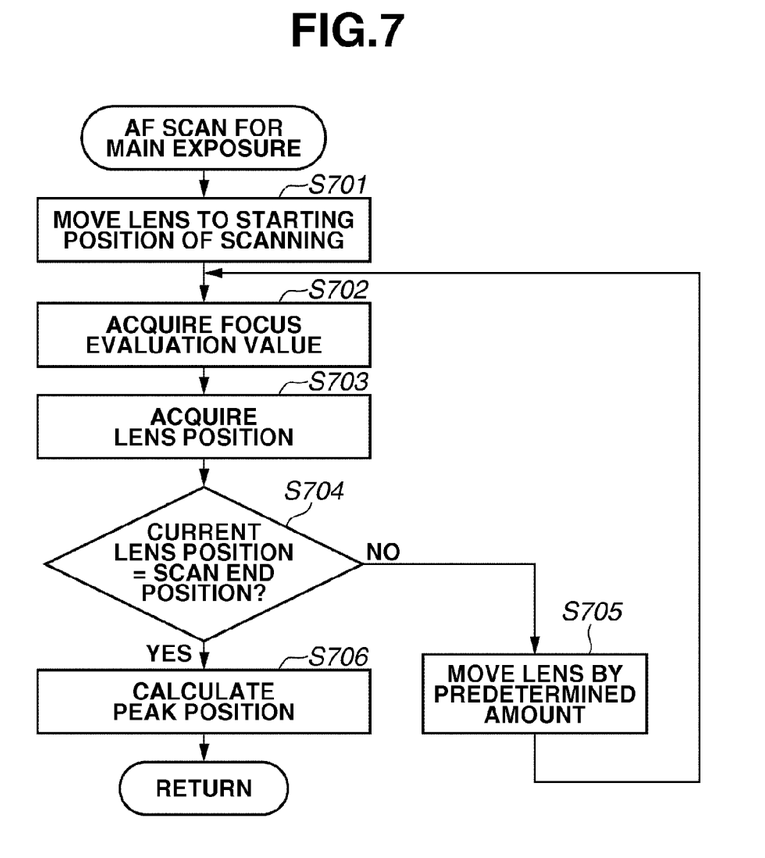
FIG. 7 is a flowchart illustrating an operation of AF scan for main exposure.

Next, the AF scan for main exposure in step S610 in the flowchart illustrated in FIG. 6 will be described with reference to the flowchart in FIG. 7.

First, in step S701, the system control unit 112 moves the focus lens 104 to the scan starting position. In this process, scan starting position is an end position of the scan range set in step S604, step S606, step S608 or step S609 illustrated in FIG. 6.

In step S702, the A/D conversion unit 107 converts an analog video signal read out from the image sensor 106 into a digital signal, according to instructions of the system control unit 112, and the image processing unit 108 extracts a high-frequency component of a luminance signal from the output. The system control unit 112 stores the extracted high-frequency component as a focus evaluation value in the memory within the system control unit 112.

In step S703, the system control unit 112 acquires a current position of the focus lens 104, and stores position data in the memory within the system control unit 112.

In step S704, the system control unit 112 determines whether a current position of the focus lens 104 is a scan end position. If the current position of the focus lens 104 is a scan end position (YES in step S704), the processing proceeds to step S706. If the current position of the focus lens 104 is not a scan end position (NO in step S704), the processing proceeds to step S705. In step S705, the system control unit 112 moves the focus lens 104 toward the scan end position by a predetermined amount. After that, the processing returns to step S702.

In step S706, the system control unit 112 calculates a peak position of the focus evaluation values from the focus evaluation values and the lens positions stored in step S702 and step S703.

Figure 8:
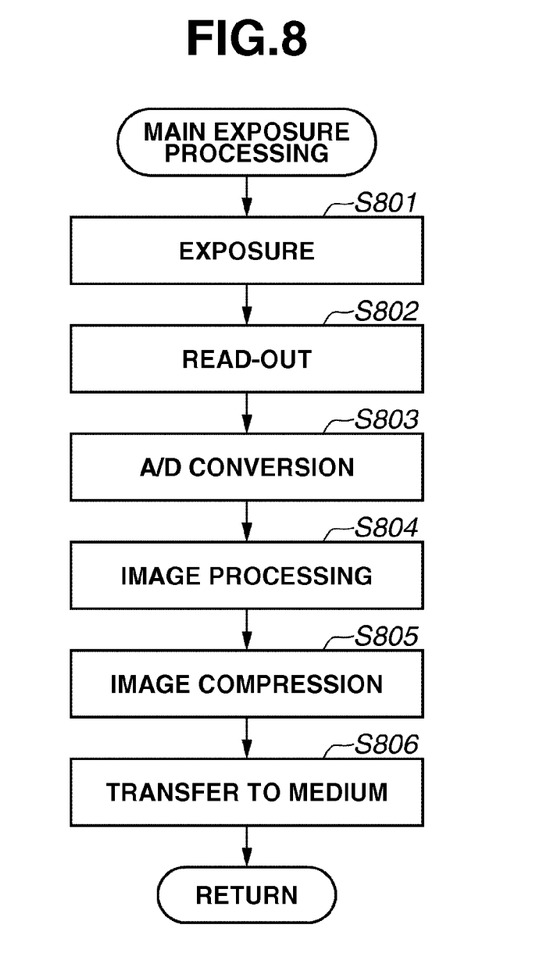
FIG. 8 is a flowchart illustrating an operation of main exposure processing.

Next, main exposure processing in step S505 in the flowchart illustrated in FIG. 5 will be described with reference to the flowchart in FIG. 8.

In step S801, the system control unit 112 exposes the image sensor 106 to light. In step S802, the system control unit 112 reads out data accumulated in the image sensor 106. In step S803, according to an instruction of the system control unit 112, the A/D conversion unit 107 converts an analog signal read out from the image sensor 106 into a digital signal.

In step S804, the image processing unit 108 performs various types of image processing on digital signals output from the A/D conversion unit 107, according to an instruction of the system control unit 112.

In step S805, the format conversion unit 109 compresses the image processed in step S804 in accordance with a format such as Joint Photographic Experts Group (JPEG), according to an instruction of the system control unit 112.

In step S806, the image recording unit 111 receives and records the data compressed in step S805, according to an instruction of the system control unit 112.

As described above, according to the present exemplary embodiment, even when the object is out of the field of view at the time of telephoto imaging, the object can be prevented from going out of focus after the field of view adjustment has been achieved, and the main object which should be focused at the time of the imaging preparation can be quickly brought into focus.

After the object has been once gone out of the field of view, for example, in a telephoto imaging scene, the field of view adjustment may be performed with the zoom once changed to the wide-angle side. In such a case, focusing can be quickly achieved, at a time point when zooming is performed to the telephoto side. Therefore, even in a case where a scene to be captured has changed, the object, which should be focused at the time of the imaging preparation, can be prevented from falling out of focus.

Hereinbefore, preferred exemplary embodiments of the present invention have been described, but the present invention is not limited to these exemplary embodiments, and various modifications and changes are possible without departing from the scope of the invention.

For example, in the present exemplary embodiment, a case where a zoom position goes to the wide-angle side by pressing the zoom operation unit 120 as an operation unit for assisting the field of view adjustment, and a zoom position goes to the telephoto side by releasing the press of the zoom operation unit 120 has been described.

However, it is not limited to this case, and an operation for moving the zoom position to the wide-angle side, or moving the zoom position to the telephoto side may be performed by using a plurality of operation units.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-203162 filed Sep. 10, 2010, which is hereby incorporated by reference herein in its entirety.

What is claimed is:

1. An imaging apparatus provided with an image sensor which converts light reflected from an object into an electric signal, the imaging apparatus comprising:

an assist control unit configured to perform an assist mode operation, wherein, in the assist mode operation, a zoom position changes to a wide-angle side in a case that a first operation of a first member by an operator is detected by a detection unit, and then a zoom position changes to a target zoom position in a case that a second operation of the first member by the operator is detected by the detection unit;

a storage processing unit configured, when the first operation of the first member by the operator is detected by the detection unit, to store the zoom position as the target zoom position; and a focus adjustment unit configured to perform an auto-focus operation in which a focus lens is moved in accordance with a signal output from the image sensor so as to bring the object into an in-focus state, wherein the auto-focus operation by the focus adjustment unit is configured to be regulated during the assist mode operation, and wherein the focus adjustment unit moves the focus lens with a first change amount per unit time after the zoom position moves towards a telephoto side in the assist mode operation, the first changing amount per unit time is greater than a second change amount per unit time, and the move of the focus lens with the second change amount is performed before the assist mode operation.

2. The imaging apparatus according to claim 1, wherein, after the zoom position has been changed to the telephoto side in the assist mode operation, the focus adjustment unit brings the object into the in-focus state by moving the focus lens.

3. The imaging apparatus according to claim 1, wherein the image sensor is configured to receive light passing through the focus lens and to capture an image, and wherein the focus adjustment unit continues to perform focusing on the object in at least one of, before the zoom position has been changed to the wide-angle side, before the zoom position has been changed to a telephoto side, and before an image is captured with the image sensor.

4. The imaging apparatus according to claim 1, wherein the assist mode operation is started from the first operation of the first member by the operator.

5. An imaging apparatus provided with an image sensor which converts light reflected from an object into an electric signal, the imaging apparatus comprising:

an assist control unit configured to perform an assist mode operation, wherein, in the assist mode operation, a zoom position changes to a wide-angle side in a case that a first operation of a first member by an operator is detected by a detection unit, and then a zoom position changes to a target zoom position in a case that a second operation of the first member by the operator is detected by the detection unit;

a storage processing unit configured, when the first operation of the first member by the operator is detected by the detection unit, to store the zoom position as the target zoom position; and a focus adjustment unit configured to perform an auto-focus operation in which a focus lens is moved in accordance with a signal output from the image sensor so as to bring the object into an in-focus state, wherein the auto-focus operation by the focus adjustment unit is configured to be regulated during the assist mode operation, and wherein the focus adjustment unit moves the focus lens according to an output from the image sensor corresponding to a first region in the assist mode operation, and moves the focus lens according to an output from the image sensor corresponding to a second region wider than the first region after the assist mode operation is performed.

6. The imaging apparatus according to claim 5, wherein the second region includes a plurality of regions.

7. The imaging apparatus according to claim 5, wherein, after the zoom position has been changed to the telephoto side in the assist mode operation, the focus adjustment unit brings the object into the in-focus state by moving the focus lens.

8. The imaging apparatus according to claim 5, wherein the focus adjustment unit moves the focus lens with a first change amount per unit time after the zoom position moves towards a telephoto side in the assist mode operation, the first changing amount per unit time is greater than a second change amount per unit time, and the move of the focus lens with the second change amount is performed before the assist mode operation.

9. The imaging apparatus according to claim 5, wherein the assist mode operation is started from the first operation of the first member by the operator.

10. An imaging apparatus provided with an image sensor which converts light reflected from an object into an electric signal, the imaging apparatus comprising:

an assist control unit configured to perform an assist mode operation, wherein, in the assist mode operation, a zoom position changes to a wide-angle side in a case that a first operation of a first member by an operator is detected by a detection unit, and then a zoom position changes to a target zoom position in a case that a second operation of the first member by the operator is detected by the detection unit;

a storage processing unit configured, when the first operation of the first member by the operator is detected by the detection unit, to store the zoom position as the target zoom position; and a focus adjustment unit configured to perform an auto-focus operation in which a focus lens is moved in accordance with a signal output from the image sensor so as to bring the object into an in-focus state, wherein the auto-focus operation by the focus adjustment unit is configured to be regulated during the assist mode operation, and wherein the focus adjustment unit moves the focus lens with a first change amount per unit time after the zoom position moves towards a telephoto side in the assist mode operation, the first changing amount per unit time is greater than a second change amount per unit time, and the moving of the focus lens with the second change amount is performed after the moving of the focus lens is performed with the first changing amount per unit time.

11. A method of controlling an imaging apparatus provided with an image sensor which converts light reflected from an object into an electric signal, the method comprising:

controlling an assist mode control unit to perform an assist mode operation in which a zoom position of the imaging apparatus is changed to a wide-angle side in a case that a first operation of a first member by an operator is detected by a detection unit, and then the zoom position is changed to a target zoom position in a case that a second operation of the first member by the operator is detected by the detection unit;

causing a storage processing unit, when the first operation of the first member by the operator is detected by the detection unit, to store the zoom position as the target zoom position; and controlling a focus adjustment unit to perform an auto-focus operation in which a focus lens is moved in accordance with a signal output from the image sensor so as to bring the object into an in-focus state, wherein the auto-focus operation by the focus adjustment unit is regulated during the assist mode operation, and wherein, in the assist mode operation, the focus adjustment unit moves the focus lens according to an output from the image sensor corresponding to a first region of focusing, and wherein, after the assist mode operation is performed, the focus adjustment unit moves the focus lens according to an output from the image sensor corresponding to a second region of focusing wider than the first region.

* * * * *